No. 813,464.

PATENTED FEB. 27, 1906.

C. W. SVENSON.
TWO SPEED HUB.
APPLICATION FILED DEC. 12, 1904.

4 SHEETS—SHEET 1.

Witnesses

Inventor
Charles W. Svenson
By his Attorneys

No. 813,464.  
PATENTED FEB. 27, 1906.  
C. W. SVENSON.  
TWO SPEED HUB.  
APPLICATION FILED DEC. 12, 1904.  
4 SHEETS—SHEET 2.
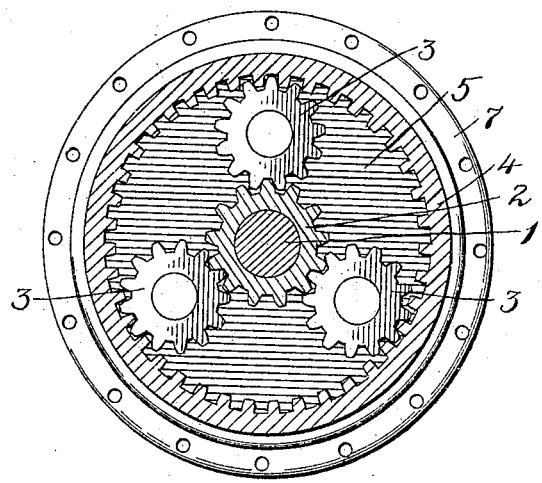
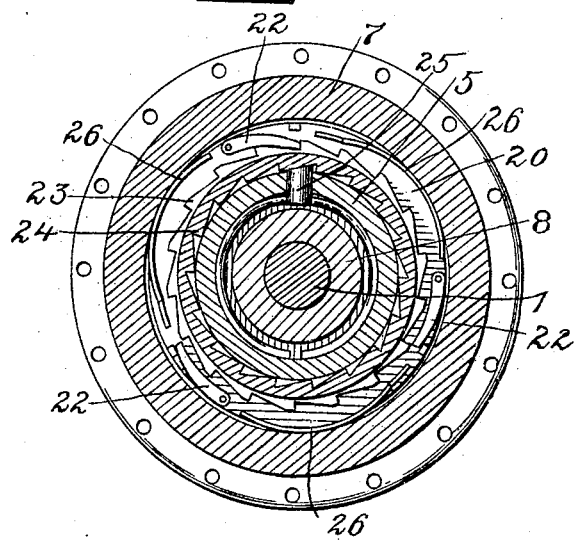
Witnesses  
Chas Weard  
L. S. James
Inventor  
Charles W. Svenson  
By his Attorneys No. 813,464. PATENTED FEB. 27, 1906.
C. W. SVENSON.
TWO SPEED HUB.
APPLICATION FILED DEC. 12, 1904.

4 SHEETS—SHEET 3.

Witnesses
Inventor
Charles W. Svenson
By his Attorneys

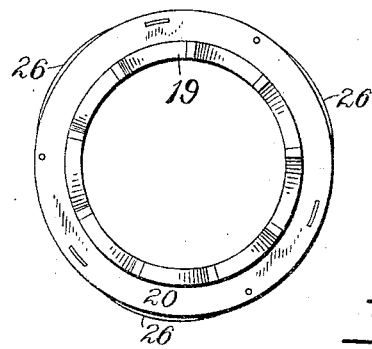
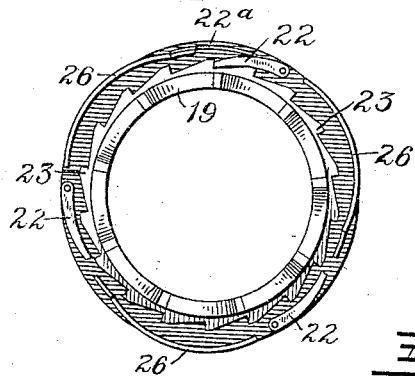
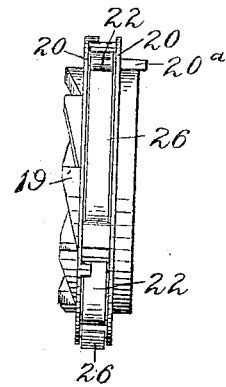
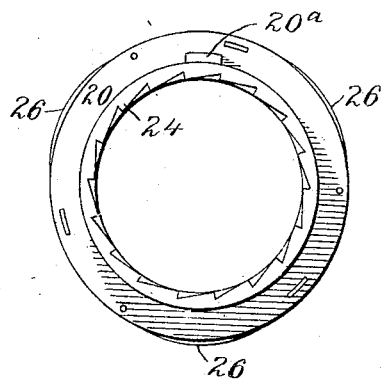

UNITED STATES PATENT OFFICE.

CHARLES W. SVENSON, OF NEW BRITAIN, CONNECTICUT, ASSIGNOR TO THE CORBIN SCREW CORPORATION, OF NEW BRITAIN, CONNECTICUT, A CORPORATION OF CONNECTICUT.

TWO-SPEED HUB.

No. 813,464.     Specification of Letters Patent.     Patented Feb. 27, 1906.

Application filed December 12, 1904. Serial No. 236,484.

*To all whom it may concern:*

Be it known that I, CHARLES W. SVENSON, a citizen of the United States, residing at New Britain, county of Hartford, State of Connecticut, have invented certain new and useful Improvements in Two-Speed Hubs, of which the following is a full, clear, and exact description.

My invention relates to transmission mechanism, and particularly to a "two-speed" hub, so called, the same being of special advantage as applied to bicycles or other vehicles.

By my invention the power applied may be transmitted directly to the wheel for high-speed or level work or may be transmitted to the wheel indirectly through the medium of the speed-reducing gears for slow speed or hill-climbing.

In combination with this apparatus I preferably employ a so-called "hub-brake," whereby the rotation of the hub may be frictionally resisted when the rider "back-pedals." In operation the moment the rider stops pedaling the speed-change mechanism automatically operates without any backward movement of the pedals. This mechanism shifts the hub-clutch devices in such a manner that the driving-sprocket will be connected with the hub directly and indirectly with each alternate stopping and starting of said sprocket. The objection to back-pedaling for the purpose of obtaining this change is the danger of applying the brake unconsciously or unintentionally. By causing the speed-change mechanism to automatically operate it is merely necessary to cease forward pedaling, whereupon the change is effected.

It is a further purpose of my invention to provide a means whereby the hub can be readily taken apart at any time, so that access may be had to all of the internal parts. This result is attained to such a degree that it is merely necessary to unscrew the usual retaining-nuts at the ends of the central shaft, whereupon the entire internal mechanism may be easily and quickly removed from the hub proper.

Figure 1:
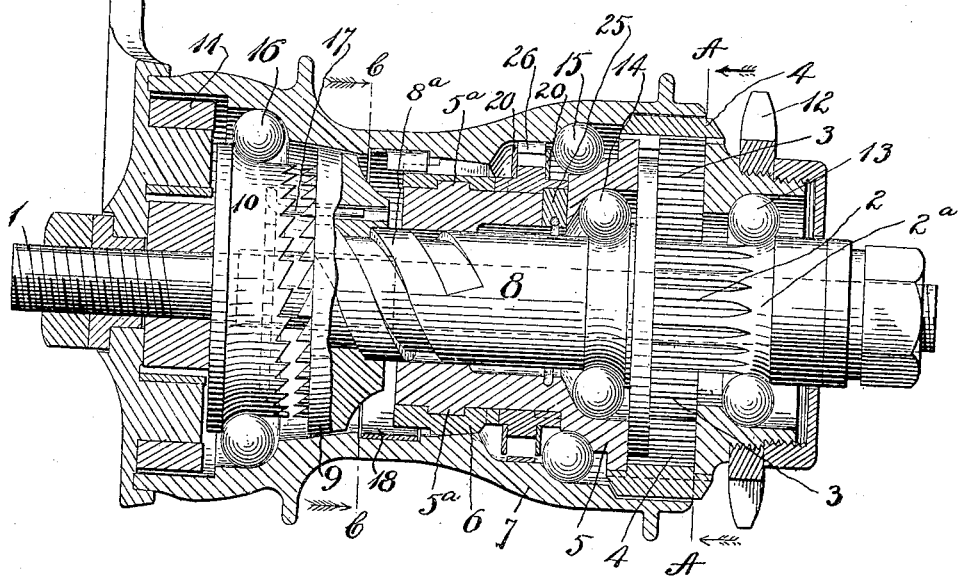
Figure 2:
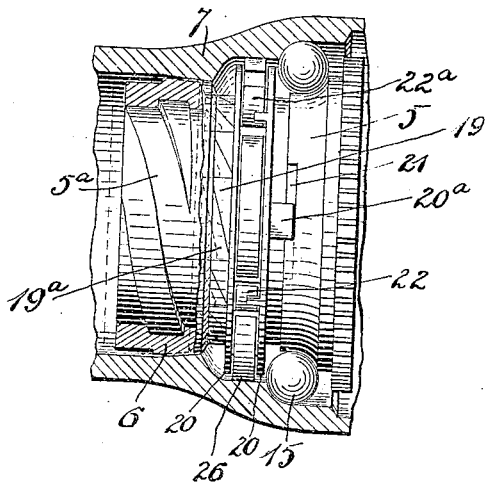
Figure 5:
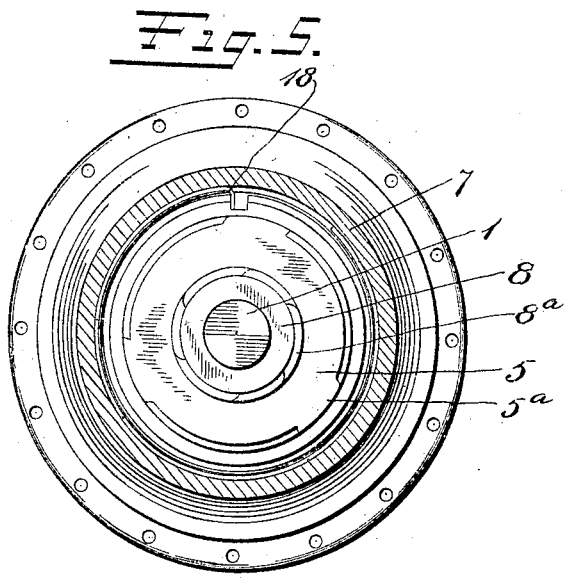
Figure 6:
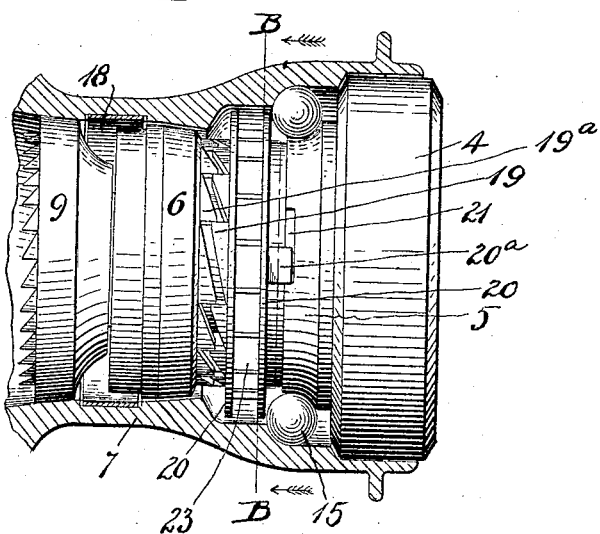

In the accompanying drawings, Figure 1 is in the main a longitudinal sectional view of the entire apparatus assembled. Fig. 2 is an elevation of certain operating parts which are shown in section in Fig. 1. Fig. 3 is a section on the line A A, Fig. 1, looking in the direction of the arrows. Fig. 4 is a section taken on the line B B of Fig. 6, said views showing certain parts similar to those shown in Fig. 2, except that the same are arranged in a different position. Fig. 5 is a section of the hub on the plane of the lines C C, the parts to the left thereof being removed. Fig. 6 is a view similar to that of Fig. 2 with certain parts added and illustrating certain parts in a different position. Fig. 7 is an end elevation of the clutch-controlling apparatus shown in Fig. 1 looking from left to right. Fig. 8 is a view of the same with a portion removed. Fig. 9 is a side elevation of the apparatus shown in Fig. 7. Fig. 10 is a view of the opposite side of the apparatus shown in Fig. 7.

In illustrating and describing my invention I have done so with particular reference to a construction suitable for bicycles, although it should be understood that it is not limited to this use; nor, in fact, is the invention limited to the specific form disclosed herein.

In the particular form shown, 1 is a central arbor. 2 is what is termed the "sun-gear" of a planetary system. This gear in use is held against rotation on the arbor 1. 3 3 are the "planetary" gears, the same being in mesh with the sun-gear 2 and also with an internal gear 4, which is the third gear of the system. This internal gear 4 is rigidly connected to the high-speed-clutch-shifting sleeve 5, the latter being provided with a spiral $5^a$, upon which is mounted a high-speed clutch 6. This high-speed clutch 6 has a tapered clutch-surface facing to the right, as shown in Fig. 1, said clutch-surface being arranged to engage with a corresponding clutch-surface formed with the inner wall of the hub 7. The planetary gears 3 3 are mounted upon pivots fixed at the end of a low-speed-clutch-shifting sleeve 8. This sleeve 8 passes through the sleeve 5, and the projecting end is provided with a spiral $8^a$, upon which is mounted the low-speed clutch 9, the latter being of slightly-greater diameter than the clutch 6 to permit the latter to be readily removed from the hub 7. It is observed that the clutch-faces of the members 6 and 9 are inclined in the same direction, which is also a feature contributing to quick and easy dismemberment of the apparatus. On one end of the second clutch 9 suitable clutch-teeth are shown which engage with the brake-operating sleeve 10, which latter, through the medium of suitable mechanism, acts to expand the brake-shoes 11 11 to bring them against the inner wall of the hub to frictionally resist the rotation of the same. This brake mechanism is set forth in United States Letters Patent No. 691,541, dated January 21, 1902, to Charles Glover, and therefore need not be described in detail.

12 is a driving-sprocket, the same being directly connected to the gear 4, and hence in direct connection with the high-speed-clutch-shifting sleeve 5.

13 represents antifriction-balls between the sprocket and the cone $2^a$, which in the preferred form is extended so that the sun-gear 2 may be integrally formed therewith.

14 represents antifriction-balls between the clutch-shifting sleeve 5 and a bearing formed on the sleeve 8.

15 represents antifriction-balls arranged between the hub 7 and a bearing formed on sleeve 5.

16 represents antifriction-balls between the hub 7 and a bearing formed on the brake-operating device 10. When the clutch 6 is held in frictional engagement with the hub 7, it is obvious that the latter will be driven directly by and at the same speed as the sprocket 12. Since said hub will then rotate at a relatively greater speed than the clutch 9, the tendency of the hub (should it by chance engage the clutch 9) would be to unwind same on its supporting-spiral $8^a$ and hold it out of engagement. To prevent any loose shifting of the clutch 9 while the high-speed clutch is in operation, a suitable friction-spring 17 may be provided. This spring may be seated in an annular groove in the member 10, while its end may be bent into parallel alinement with the arbor 1, so as to project into a longitudinal hole in the clutch 9, whereby it will act as a drag on the latter, and yet will permit it to be shifted longitudinally.

18 is a friction-spring operating lightly on the inside of the hub 7 and engaged with the clutch 6, its function being similar to that of spring 17.

Since the clutch-shifting sleeve 5 rotates at a relatively greater speed than the clutch-shifting sleeve 8, it is obvious that the tendency would be to draw the clutch 6 into an engagement with the hub in advance of the clutch 9, whereupon for the foregoing reasons the clutch 9 could not be utilized unless some means were provided to block out and prevent the clutch 6 from engaging said hub 7. I have therefore provided what I call a "controlling member," the function of which is to alternately block out the clutch 6, so that it cannot be drawn by the spiral $5^a$ into engagement with the hub. When this clutch 6 is blocked out, it is obvious that then the power can only be imparted to the hub 7 indirectly through the medium of the clutch 9. This clutch 9 is driven by the sleeve 8, which in turn is driven through the planetary gears at a relatively reduced speed. Hence when this clutch 9 is in operation a relatively slow speed will be maintained, and the rider may more easily climb steep grades.

In the drawings I have shown the preferred form of the controller, by which the high-speed clutch 6 is blocked out at each alternate stopping and starting of the sprocket 12. This controller is a step-by-step rotatable device located in a pawl-carrying cage, the latter being mounted to have limited rotation upon the plain portion of the clutch-shifting sleeve 5.

In Figs. 7 to 10 details of the controlling device with the cage are shown. On one end of the controlling device are inclines 19 19, preferably formed on substantially the same pitch as the spiral $5^a$. These inclines face up with corresponding inclines $19^a$ $19^a$ upon the end of the clutch 9. Means is provided to shift the controller so that when in one position the clutch 6 may be drawn to the right until inclines $19^a$ reach the lowest point of inclines 19, as shown in Fig. 2, or so that the clutch 16 will engage with the hub, while at the next step of the controlling device the inclines will be shifted to such position that they will check the rotation of the clutch 6 before it can be drawn by the spiral $5^a$ into said hub engagement. This second position is shown in Fig. 6. The points of the inclined surfaces 19 and $19^a$ in this figure are shown as engaging, and the continued rotation of the shifting-sleeve 5 will simply carry around and around the clutch 6, the latter being entirely free of the hub. On the next step the inclines or cam-surfaces 19 19 will be shifted to the original position, Fig. 2, in which the clutch 6 may engage the hub 7. It is by this means that the clutches 6 and 9 are alternately engaged with the hub when power is applied, so that the rider may in one instance drive directly to the hub and in the other instance indirectly to the hub through the medium of the gears.

The means shown for effecting the step-by-step action of the controlling device includes a pawl-carrying cage arranged adjacent to the controlling device and having limited movement back and forth. The cage comprises in the main two plates 20 20. One of these plates may carry an offset $20^a$, which acts as a limiting-stop and projects into a short slot 21 in a movable part of the device—for example, the end of the bearing upon which the balls 15 travel. (See Figs. 2 and 6.) Between the plates 20 20 are arranged pawls 22, which are arranged to engage with teeth 23 upon the controlling device. (See Figs. 4 and 8.) In the form shown three pawls are provided, so that in all positions at least one pawl will operate by gravity. A short spring 22ª may be provided, as shown in Fig. 8, for one or more of said pawls to press it into engagement with the teeth 23. It will be seen that if the frame or cage is given a rocking movement these pawls will drive the controlling device ahead step by step. The length of the slot 21 is sufficient to permit pawls 22 to engage the teeth 23 successively. The length of the teeth 23 is such that when the controlling device is shifted the length of a single tooth it will move the controller so that the inclines 19 19 will alternately present themselves to the clutch 6, as shown in Figs. 2 and 6. To prevent backward rotation of the controlling member, the same is provided with internal teeth 24, which are engaged by a spring-pressed pawl 25, arranged in a recess on a solid part of the sleeve 5. This stop 25 successively engages the teeth 24. 26 represents friction-springs carried by the plates 20 20 and extending outwardly, so as to engage frictionally with the internal wall of the hub 7. It will now be seen that if the rider ceases pedaling the sleeve 5 will come to rest. The continued advance rotation of the hub will, through the frictional engagement of the springs 26 26, shift ahead one step the pawls 22, and thereby the controller, so that the offset 20ª will stand in the opposite end of the slot 21 from that shown in Fig. 6. This advancing of the controller one step will either leave the clutch 6 free to engage with the hub or block it out. As soon as the sprocket 12 is again rotated ahead it will turn the sleeve 5, and the same will be shifted relatively to the cage, so that the projection 20ª will resume its original position in the slot 21, the pawls 22 picking up the next adjacent teeth 23 ready to shift the controlling device another step when the rider again ceases pedaling.

Inasmuch as the operation of the apparatus has been described incidentally with the explanation of the mechanism, a further description is unnecessary. It might, however, be added that I contemplate that in carrying out my invention various changes may be made without departure from the spirit or scope thereof.

In the claims "driving means" refers to the sprocket 12 or any substitute therefor. It should not be understood that it is actually necessary to bring the driving means to a position of rest in order to permit the automatic shifting of the clutches. A sufficient slowing down of the driving means will permit the hub to rotate ahead of it, so as to effect this change. In speaking of "stopping" the driving means I use said term in a broad sense. I do not mean thereby that the driving means must necessarily be brought to a position of rest.

What I claim is—

1. In an apparatus of the character described, a hub, a driving means therefor, two independent longitudinally-movable clutches, means to move both of said clutches in the same longitudinal direction to engage the hub, and in a reverse direction to disengage the hub, said clutch-moving means operating alternately on said clutches, and means for moving said clutches, including direct engagement between said driving means and one of said clutches, and indirect gear engagement between said driving means and the other clutch.

2. In an apparatus of the character described, a hub, a driving means, two similarly-faced independent longitudinally-movable annular clutches, means of connection whereby one of said clutches is rotatable by said driving means at a corresponding speed, means of connection whereby the other clutch is rotatable by said driving means at a relatively reduced speed, means for moving said clutches alternately toward the same end of the hub to effect driving engagement with said hub.

3. In an apparatus of the character described, a hub, a driving means, a tapered annular clutch and means of connection whereby the same is rotatable by said driving means at a corresponding speed, the tapered portion of said clutch facing toward said driving means, a second tapered annular clutch, the tapered portion thereof facing toward the first-mentioned clutch, and means of connection whereby said second clutch is rotatable by said driving means at a relatively reduced speed, and means for alternately causing said clutches to shift longitudinally and engage said hub.

4. In an apparatus of the character described, a hub, a driving means, two annular clutches and means to cause the same to alternately engage the hub when either clutch is moved toward one end of the hub, and to free either clutch from said hub when moved toward the opposite end.

5. In an apparatus of the character described, a hub, two tapered clutch-surfaces formed therein and faced in the same direction, one of said clutch-surfaces being of slightly greater diameter than the other clutch-surface, independent annular clutches adapted and arranged to move longitudinally and engage alternately with said surfaces, means to move said clutches longitudinally, a driving means, and connecting means whereby the latter is connected with one of said clutches so as to rotate the same at a certain speed relatively thereto, and with the other clutch so as to rotate the same at a relatively reduced speed.

6. In an apparatus of the character described, a hub, a rotatable driving means, two annular longitudinally-movable clutches arranged to alternately engage said hub, means of connection between said driving means and each of said clutches, whereby one of the latter will be rotated at a corresponding speed to the driving means, and the other at a relatively reduced speed, and means for automatically and alternately coupling said clutches with said hub by each successive pause of said driving means.

7. In an apparatus of the character described, a hub, a driving means therefor, gears, longitudinally-movable clutches for alternately coupling said driving means with said hub directly in one instance and indirectly through the medium of said gears in the other instance, said devices including means for automatically blocking out one of said clutches from engagement with said hub on each alternate pause of said driving means.

8. In an apparatus of the character described, a hub, a driving means therefor, gears, longitudinally-movable clutches for alternately coupling said driving means with said hub directly in one instance and indirectly through the medium of said gears in the other instance, said devices including means for automatically blocking out one of said clutches to prevent its engagement with the hub on each alternate pause of the driving means, said blocking-out device including an intermittently-acting controller.

9. In an apparatus of the character described, a hub, driving means therefor including longitudinally-movable clutch mechanism, a direct drive and a gear-drive, and means operated by the movement of said hub for automatically controlling said clutch mechanism to cause the direct drive and gear-drive to alternately coöperate as a connecting medium between the hub and the driving means.

10. In an apparatus of the character described, a hub, driving means therefor including two longitudinally-movable clutches, a direct drive and a gear-drive operating through said clutches alternately, one of said clutches being of larger diameter than the other clutch, with seats within said hub adapted to receive said clutches respectively.

Signed at New Britain, Connecticut, this 9th day of December, 1904.

CHARLES W. SVENSON.

Witnesses:
G. E. ROOT,
LAURA M. BRAMAN.